(12) United States Patent
Krimmer et al.

(10) Patent No.: US 6,578,818 B1
(45) Date of Patent: Jun. 17, 2003

(54) VALVE DEVICE

(75) Inventors: Erwin Krimmer, Pluederhausen (DE); Wolfgang Schulz, Bissingen (DE); Tilman Miehle, Kernen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/423,526

(22) PCT Filed: Nov. 24, 1998

(86) PCT No.: PCT/DE98/03459

§ 371 (c)(1),
(2), (4) Date: Apr. 10, 2000

(87) PCT Pub. No.: WO99/46500

PCT Pub. Date: Sep. 16, 1999

(30) Foreign Application Priority Data

Mar. 10, 1998 (DE) .......................... 198 10 212

(51) Int. Cl.⁷ .............................. F16K 31/02
(52) U.S. Cl. .................... 251/129.2; 251/176
(58) Field of Search .............. 251/129.2, 176, 251/193

(56) References Cited

U.S. PATENT DOCUMENTS

| 75,210 A | * | 3/1868 | Simonds ................. 251/176 X |
| 1,550,725 A | * | 8/1925 | Jung ....................... 251/176 |
| 2,835,468 A | * | 5/1958 | Sparks .................... 251/176 X |
| 3,510,100 A | * | 5/1970 | Makusay et al. ......... 251/129.2 |
| 4,219,182 A | * | 8/1980 | Schenck ................. 251/176 X |
| 4,783,047 A | * | 11/1988 | Baltus et al. ........ 251/129.2 X |
| 5,566,922 A | * | 10/1996 | Tanaka et al. .......... 251/193 X |
| 5,791,318 A | * | 8/1998 | Schultz et al. .......... 251/205 X |

* cited by examiner

Primary Examiner—Ehud Gartenberg
Assistant Examiner—Eric Keasel
(74) Attorney, Agent, or Firm—Ronald E. Greigg

(57) ABSTRACT

The current invention relates to a valve device (1), in particular for tank ventilation in motor vehicles, having a valve housing (6, 7, 8) with an inlet fitting (10) and an outlet fitting (11), having an armature (26) that is provided inside the valve housing (6, 7, 8) and can be moved by means of an electromagnet (22), having a closing body (40) that is connected to the armature (26) and closes a sealing seat (13) of the outlet fitting (11) when the electromagnet (22) is without power and opens it when the electromagnet (22) is supplied with power wherein the free cross sectional area between the inlet fitting (10) and the outlet fitting (11) can be continuously changed, and having a spring element (50) which presses the closing body (40) with a slight pressure against the sealing seat (13). In order to assure a reliable seal of the sealing seat (13) in a simple manner, according to a first embodiment according to the invention, the spring element (50) is comprised of a leaf spring (48) which is connected on the one end to the armature (26) and on the other end to the closing body (40) and furthermore, is pre-stressed against the closing body (40). As an alternative embodiment possibility, a spring element (50) with a spiral spring (49) is proposed, which deforms exclusively in the direction of its longitudinal axis even during the stroke motion of the valve device (1).

9 Claims, 4 Drawing Sheets

VALVE DEVICE

PRIOR ART

The invention is based on a valve device, in particular for tank ventilation in motor vehicles.

A valve device of this kind is used to regenerate the activated charcoal in the fuel vapor retention system for fuel circuits in motor vehicles as described for example in the reference Bosch—Technische Unterrichtung, Motormanagement Motronic [Bosch—Technical Instruction, Engine Management Motronics], $2^{nd}$ edition, August 1993, pp. 48 and 49. Fuel retention systems limit HC emissions and are equipped with an activated charcoal container to which a ventilation line leads from the fuel tank. The activated charcoal retains the fuel vapor and permits only the air to escape into the atmosphere, which simultaneously provides for a pressure compensation. In order to repeatedly regenerate the activated charcoal, another line leads from the activated charcoal container to an intake tube in which a vacuum is produced when the engine is running, which causes air to flow from the atmosphere, through the activated charcoal, and into the intake tube. As a result, the temporarily stored fuel vapor is entrained and is supplied to the combustion in the engine. The regenerating flow is metered by means of a valve device of the type mentioned at the beginning in the line to the intake tube.

The regenerating flow is an air/fuel mixture that is composed of air enriched with fuel vapor. Because its composition cannot be measured or can only be measured at a very high-cost, the regenerating flow represents a considerable impedance for the lambda closed-loop control since in addition, the specific density of fuel vapor is approximately twice as high as that of air. The valve device is therefore triggered so that the activated charcoal container is sufficiently rinsed and the lambda deviations are as minimal as possible.

The regenerating valve is closed at regular intervals so that the mixture adaptation can function independently of tank ventilation influences. The valve device is preferably embodied in the shape of a ramp.

The design of such a valve device for tank ventilation is known, for example, from DE 195 40 021 A1. The valve device is comprised of a valve housing, which has an inlet fitting for connecting to a ventilation fitting of the fuel tank or an adsorption filter or activated charcoal container connected to the tank and an outlet fitting for connecting to the intake tube, an armature is provided, which is disposed inside the valve housing, can be moved by an electromagnet, is pressed against a sealing seat by a valve spring and closes a flow connection from the inlet fitting to the outlet fitting when the electromagnet is without power, and opens this flow connection when the electromagnet is supplied with power. In order to be able to precisely meter extremely small fuel vapor quantities while at the same time having a simple design, a metering opening is provided, preferably with a V-shaped cross sectional area, and this opening is disposed between the inlet fitting and the sealing seat and can be controlled by the armature.

Another valve device of the type mentioned at the beginning has been disclosed by DE 297 17 078 U1. With this tank ventilation valve, the armature is connected to a closing body, which can continuously change a free cross-sectional area between the inlet fitting and the outlet fitting from a sealed position to a maximal position. The closing body is preferably constituted by a sealing disk that has a through opening and rests on a sealing seat of the outlet fitting. The sealing disk is pressed against the sealing seat with a slight pressure by way of a spring element so that the sealing disk rests in a sealed fashion against this seat but remains movably supported. In this connection, the spring element is guided by pins on the sealing disk on the one hand and on a screen in the inlet fitting on the other. In this embodiment, the spring element must move along with the valve stroke so that as a result of being deformed in a direction radial to its longitudinal axis, the spring element exerts undesirable lateral forces on the magnet armature support and on the sealing seat. Furthermore, the sealing disk can therefore tilt in its provided mount and sealing problems arise at the sealing seat of this tank ventilation valve.

ADVANTAGES OF THE INVENTION

The valve device has the advantage over the prior art that due to the construction of the spring element with a leaf spring, which is connected to both the armature and the closing body, the entire apparatus of the closing body and spring element moves along with the stroke of the armature. As a result of this, no disruptive lateral forces occur at the spring element and at the same time, manufacture tolerances of the sealing seat and closing body can be compensated for so that the sealing seat of the outlet fitting is sealed better and more reliably.

The valve device has an advantage that the spiral spring of the spring element deforms exclusively in the direction of its longitudinal axis during the stroke motion of the armature so that here, too, no lateral forces occur at the spring element which could lead to sealing problems. To this end, it is particularly advantageous to rotatably support the spring element in the valve housing so that the stroke motion of the armature produces a rotating motion of the spring element. Likewise, the spring element can be disposed in an advantageously stationary fashion in the valve housing and at the same time, the spring element is not connected to the closing body which means that the closing body can move along with the stroke motion of the armature while the spring element remains unchanged in its position.

The valve devices according to the invention are furthermore suitable for engines with gasoline direct injection since large scavenging quantities of fuel vapor can also be conveyed without trouble through the valve devices. Furthermore, the valve devices can be operated in both a continuous and pulsed fashion with high and low frequencies.

Other advantageous embodiments and improvements of the valve devices disclosed are possible by means of the measures disclosed herein after.

It is particularly advantageous that the fastening device of the closing body on the armature is guided in a housing groove in the valve housing in order to prevent the armature and the components connected to it from rotating or tilting and therefore to prevent a leak at the sealing seat.

BRIEF DESCRIPTION OF THE DRAWINGS

Exemplary embodiments of the invention are shown in a simplified form in the drawings and will be explained in detail in the subsequent description.

DESCRIPTION OF THE EXEMPLARY EMBODIMENTS

Figure 1:
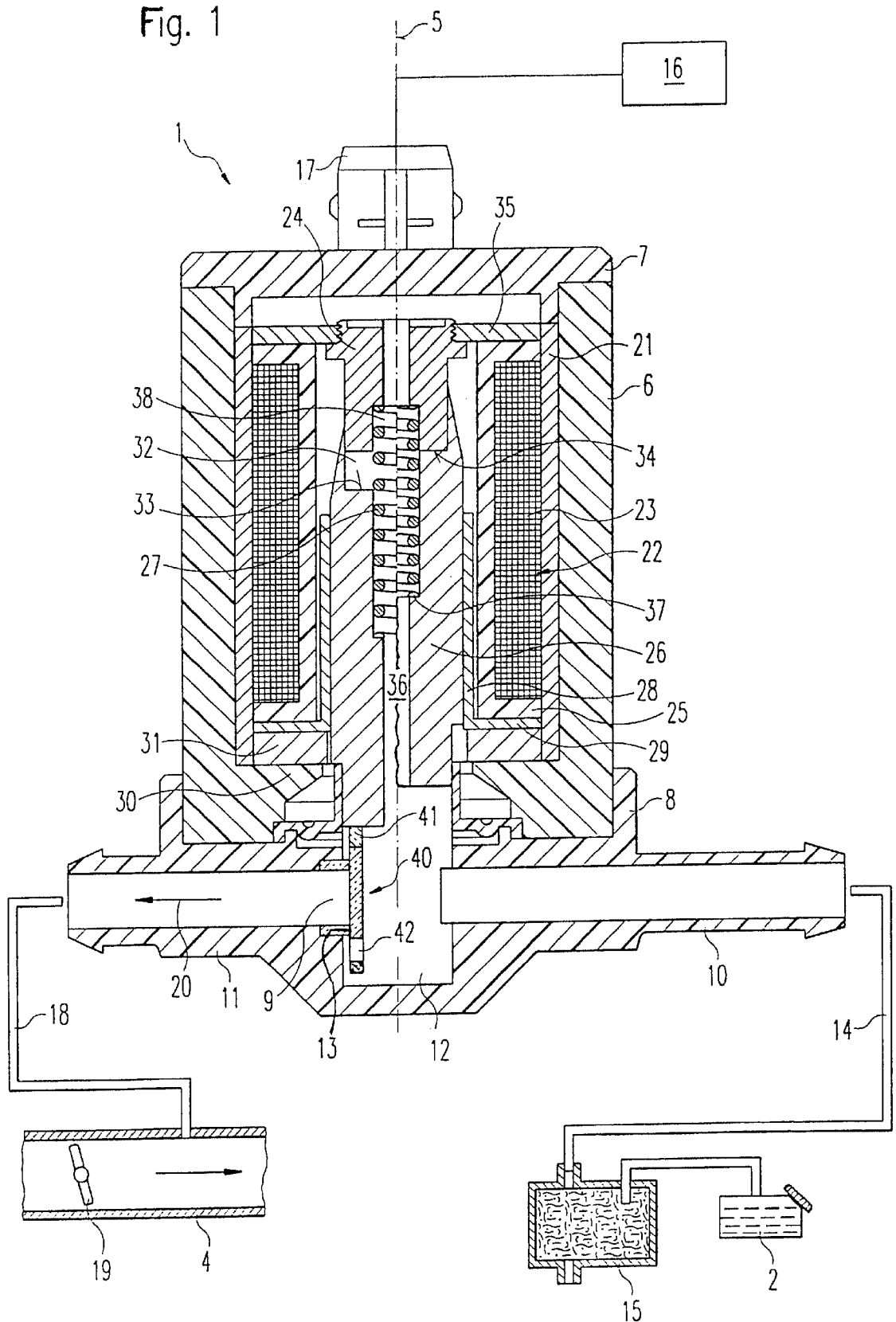
FIG. 1 is a longitudinal section through a first exemplary embodiment of a valve device embodied according to the invention.

The valve device 1 which is shown in a longitudinal section FIG. 1 is used for the metered introduction of fuel vapor, which has evaporated from a fuel tank 2 of an internal combustion engine, not shown, in particular a mixture-compressing engine with externally supplied ignition, into an intake tube 4 of the engine. The valve device 1 is part of a fuel vapor retention system described at the beginning.

The valve device 1 has a valve housing, which is comprised for example of three parts, including a cylindrical base housing 6, a housing cover 7 that can be placed on the base housing 6, and a bottom housing part 8. The cylindrical base housing 6, the housing cover 7, and the bottom housing part 8 are preferably made of plastic, for example through the use of plastic injection molding technology.

The bottom housing part 8 has an inlet fitting 10 and an outlet fitting 11 which respectively feed into an inner chamber 12 of the valve device 1, which consequently represents a connection between the two fittings 10 and 11. The inlet fitting 10 is used to connect the valve device 1, for example by way of a first hose line 14, to an adsorption filter 15 connected to the fuel tank 2. The adsorption filter 15 is filled with a storage medium for fuel vapor, in particular activated charcoal, and is used to temporarily store fuel vapor that has evaporated from the fuel tank 2. The outlet fitting 11 extends, for example, like the inlet fitting 10 lateral to the longitudinal axis 5 of the valve device 1 and likewise protrudes radially from the bottom housing part 8. The outlet fitting 11 is furthermore provided for the connection of a second hose line 18, which for example feeds into the intake tube 4 downstream of a throttle valve 19 rotatably disposed in the intake tube 4. As shown in the exemplary embodiments of FIGS. 3 and 4, the inlet fitting 10 can for example also protrude parallel to or in the extension of the longitudinal axis 5 of the valve device 1, downward from the bottom housing part 8 so that the inlet fitting 10 and outlet fitting 11 are disposed at an angle of approximately 90° in relation to one another.

In a magnet housing 21 on the inside of the base housing 6, an electromagnet 22 is accommodated which has a cylindrical excitation coil 23 and a magnet core 24. The magnet housing 21 is embodied as sleeve-shaped and carries the excitation coil 23 on its interior, which coil is wound onto a coil carrier 25 comprised for example of plastic. The excitation coil 23 encompasses a preferably metallic armature 26 of the valve device 1, which can be attracted by magnetic forces, in order to move this armature counter to the force of a valve spring 27 in the direction of the longitudinal axis 5 of the valve device 1 when the excitation coil 23 is supplied with power. To this end, the armature 26 is supported so that the armature can move axially in a guide sleeve 28 disposed in the base housing 6. The coil carrier 25 is disposed with a radial distance from the outer surface of the smaller diameter guide sleeve 28 on the inside of the base housing 6 and radially extends to the inner wall of the magnet housing 21. The radial distance of the coil carrier 25 from the outer surface of the guide sleeve 28 thereby prevents a jamming of the armature 26 due to possible heat expansions, in particular of the excitation coil 23 during the operation of the valve device 1. The coil carrier 25 rests axially against an annular shoulder 29 of the guide sleeve 28. The shoulder 29 likewise extends to the inner wall of the magnet housing 21. Between the shoulder 29 of the guide sleeve 28 and a radially extending intermediary piece 30 of the base housing 6, a contact disk 31, for example, is also provided, which is disposed with radial distance from the outer surface of the armature 26.

In order to limit the maximal deflection of the armature 26, on its end oriented toward the housing cover 7 this armature has a recess 32, which is preferably embodied as cylindrical and at least partially contains the magnet core 24, which is embodied as sleeve-shaped. When maximally deflected, the armature 26, with its annular end face 33 disposed in the recess 32, strikes against an annular face 34 of the magnet core 24. In order to permit a variable adjustment of the maximal stroke of the armature 26, the magnet core 24 can advantageously be embodied as axially movable. To this end, the magnet core 24 has, for example, an external thread which engages in an internal thread in a magnet base 35 covering the sleeve-shaped magnet housing 21 in order to correspondingly move the magnet core 24 axially by means of rotating or screwing so that there is a variably adjustable armature stop for the armature 26.

The armature 26 is embodied as a hollow cylinder and has a central through opening 36 which extends in the axial direction along the longitudinal axis 5 of the valve device 1 from the recess 32 on the top end of the armature 26 to its end disposed in the bottom housing part 8 and feeds into the inner chamber 12. In the through opening 36, a circumferential shoulder 37 is embodied which radially enlarges the through opening 36 in order to contain the valve spring 27 between the shoulder 37 and a recess 38 provided in the sleeve-shaped magnet core 24. The valve spring 27 is supported on one end against the magnet core 24 in the recess 38 and is supported on the other and against the shoulder 37 in the through opening 36 of the armature 26.

Figure 2:
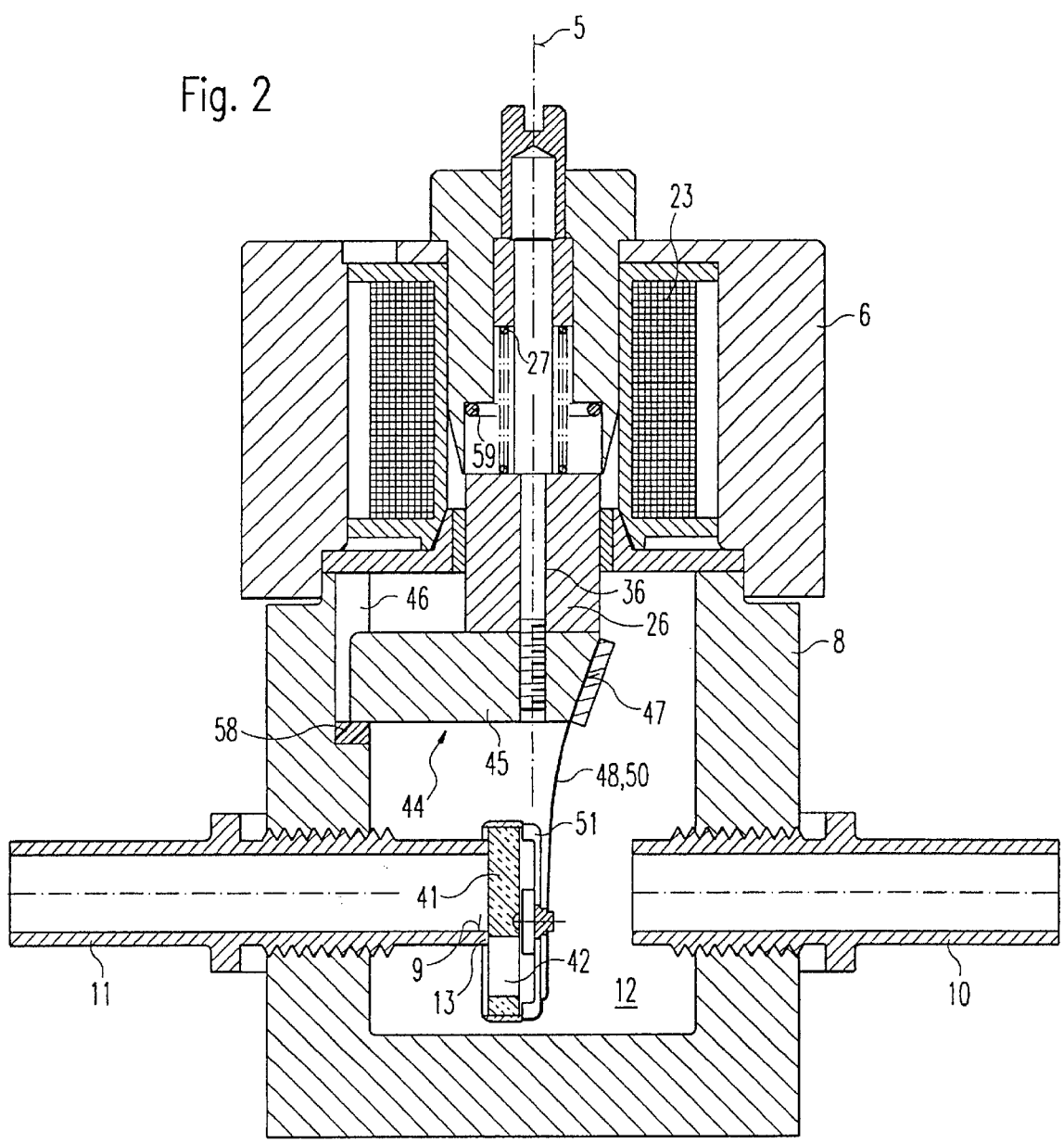
FIG. 2 is an enlarged, slightly modified sectional representation of the apparatus of the closing body according to the first exemplary embodiment from FIG. 1.
Figure 3:
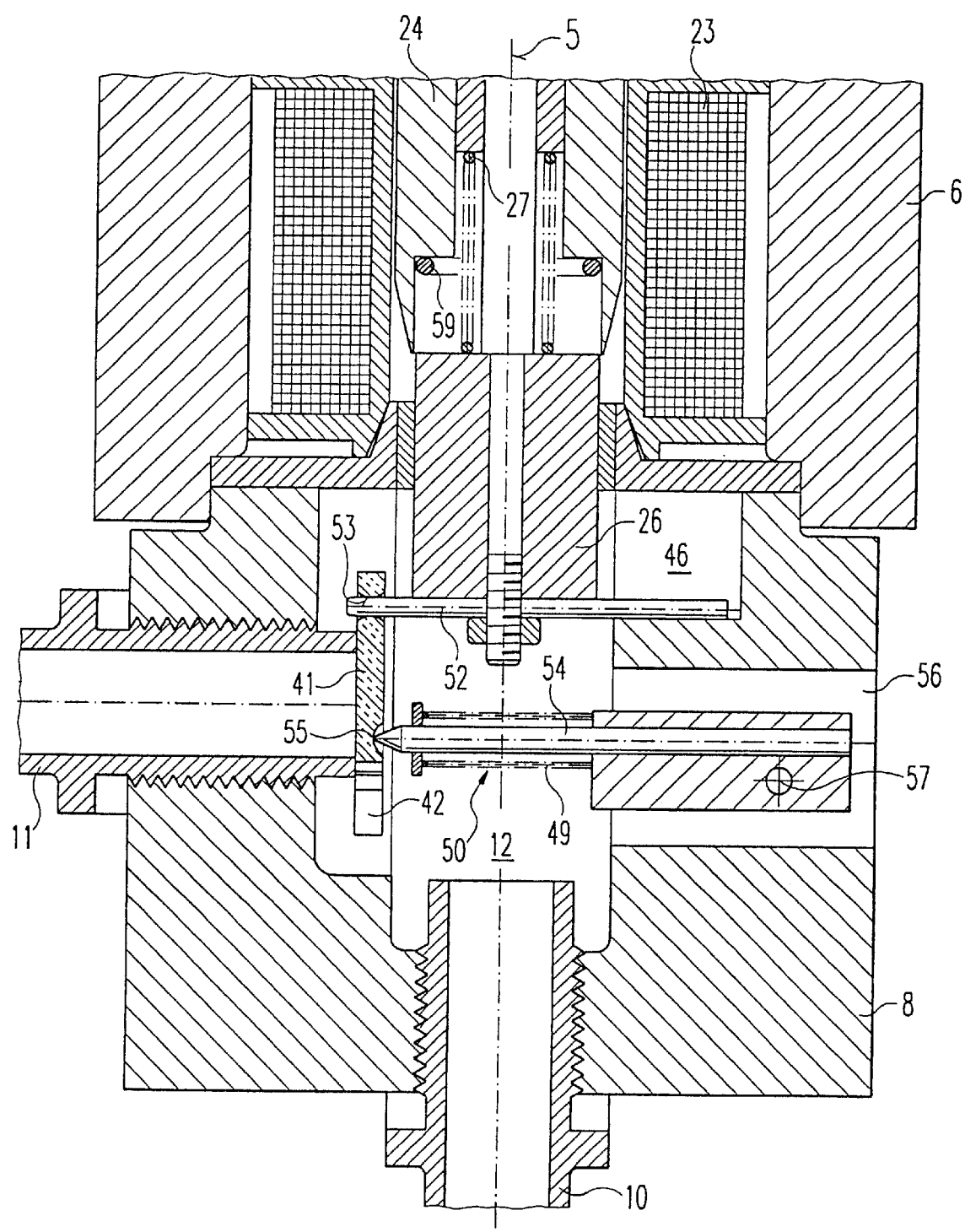
FIG. 3 is an enlarged sectional representation of a second exemplary embodiment of a valve device embodied according to the invention.
Figure 4:
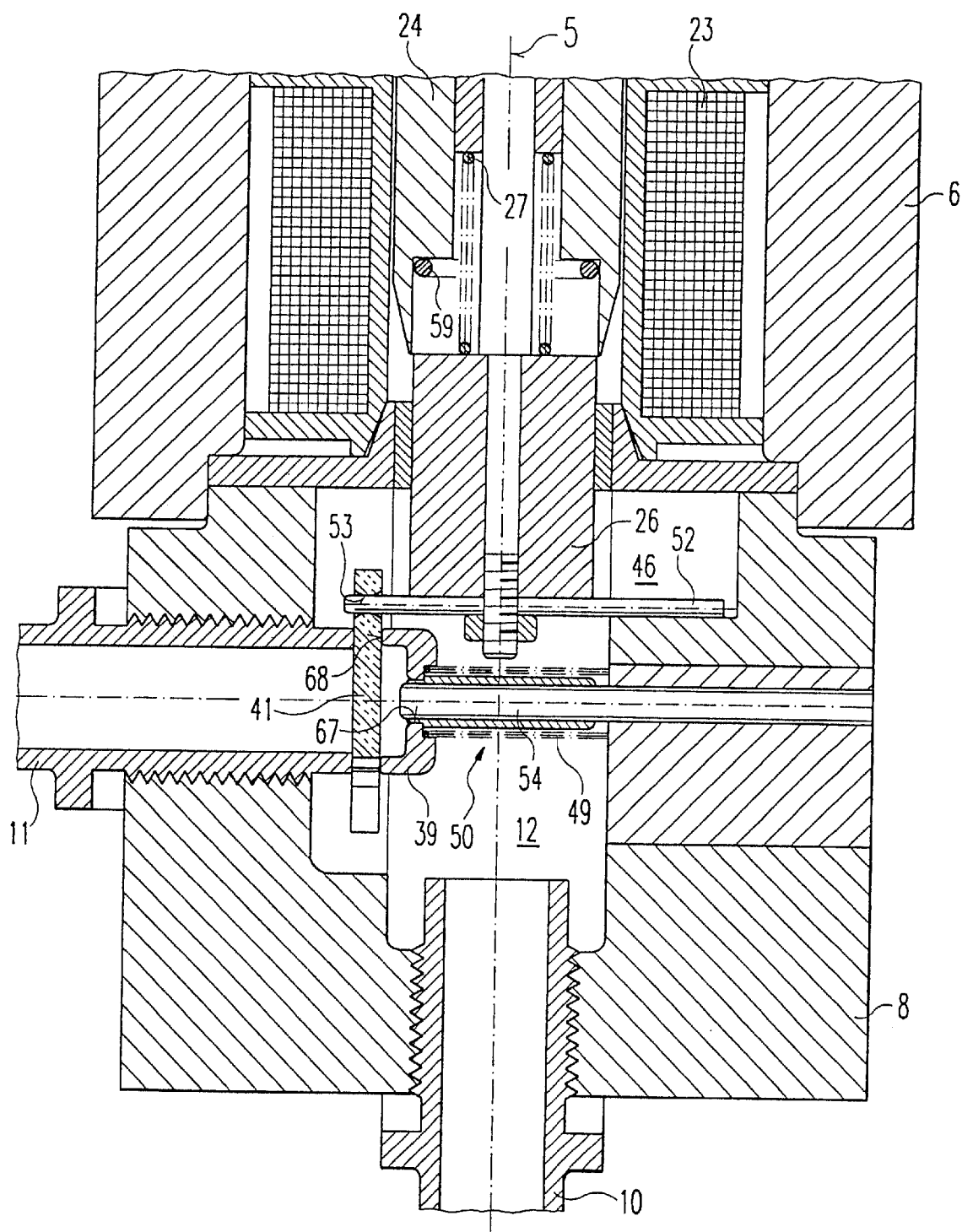
FIG. 4 is an enlarged sectional representation of a third exemplary embodiment of a valve device embodied according to the invention.

The bottom end of the armature 26 is furthermore connected directly or by means of a suitable fastening device 44 to a closing body 40, which is only depicted schematically in FIG. 1 and will be described in more detail in conjunction with FIGS. 2 to 5. The closing body 40 is essentially constituted by a sealing disk 41, which has a metering opening 42. The sealing disk 41 rests against an annular guide face of a sealing seat 13, which is disposed on the inner chamber end of the outlet fitting 11. The sealing seat 13 or at least its guide face and the sealing disk 41 are preferably comprised of a material with a low frictional resistance, for example a ceramic. In addition, a spring element 50 is provided, which is associated with the closing body 40 and is not shown in FIG. 1 for the sake of better visibility, which presses the closing body 40 with a slight spring force against the sealing seat 13. The spring force of the spring element 50 in this connection is selected as slight so that the closing body 40 can be moved in relation to the sealing seat 13 in the axial direction of the valve device 1. According to the invention, various embodiments can be provided for the spring element 50, as shown in FIGS. 2 to 4.

Figure 5:
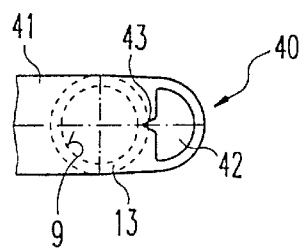
FIG. 5 is a top view of a closing body of the valve device.

The valve device 1 shown in FIG. 1 performs the following functions:

When the excitation coil 23 is without power, the valve spring 27 holds the armature 26 in its rest position. The closing body 40 is disposed in its sealed position in which the sealing disk 41 completely covers the through opening 9 of the outlet fitting 11 that is constituted by the sealing seat 13. The metering opening 42 of the sealing disk 41 is disposed outside the through opening 9 of the sealing seat 13 so that a connection between the inner chamber 12 and the outlet fitting 11 is sealed off by the sealing seat 13 and the sealing disk 41. The top view of the closing body 40 shown in FIG. 5 illustrates this by virtue of the fact that the metering opening 42 of the sealing disk 41 is disposed next to the through opening 9 of the sealing seat 13 that is shown with dashed lines.

When the excitation coil 23 is supplied with power, the magnetic armature 26 is attracted toward the magnet core 24 by the magnetic forces of the excitation coil 23 and assumes every axial intermediary position. In its end position, simultaneously the maximal open position of the valve device 1 or the closing body 40, the annular end face 33 of the recess 32 of the armature 26 rests against the annular face 34 of the magnet core 24, as shown in the half of the valve device 1 disposed to the right of the longitudinal axis 5 in FIG. 1. By way of the fastening device 44, the closing body 40 is likewise moved in the direction of the excitation coil 23. By means of this, the metering opening 42 of the sealing disk 41 comes to coincide with the through opening 9 of the sealing seat 13 so that a connecting path opens between the connection fittings 10 and 11 by way of the inner chamber 12 and fuel can travel from the inlet fitting 10 through the metering opening 42 and into the outlet fitting 11.

The degree of coincidence between the metering opening 42 of the sealing disk 41 and the through opening 9 of the sealing seat 13 changes in accordance with the stroke of the armature 26 or the closing body 40. The stroke of the armature 26 operating in opposition with the valve spring 27 is thereby determined by means of the intensity of the magnetic field of the electromagnet 22. An electronic control unit 16 is provided to trigger the electromagnet 22 and is electrically connected to the electromagnet 22 by way of an electric line and a plug connection 17 that is preferably formed onto the housing cover 7 and of one piece with the cover. A proportional movement of the armature 26 is produced in accordance with the magnitude of the control current and the varying intensity of the magnetic field of the excitation coil 23 that sets in as a result.

The electronic control unit 16 supplies the electromagnet 22 with a trigger pulse sequence of an electric voltage, preferably with a relatively high frequency of 100 Hz, for example. The valve device 1 shown in FIG. 1, however, can also be operated in a pulsed fashion or with triggering frequencies in the range from approximately 5 to 150 Hz. The trigger pulse sequence is thereby sent by the electronic control unit 16 with a keying ratio that can be changed by the control unit. The keying ratio indicates the quotients of the pulse duration in relation to the pulse interval of subsequent pulses, for example in percentage form. A triggering of this kind is known as so-called pulse-width modulation. The excitation coil 23 preferably has an excitation winding which has a virtually constant resistance value independent of temperature influences of the valve device 1, which makes it possible to eliminate a so-called current-controlled output stage in the triggering.

From the top view of the closing body 40 shown in FIG. 5, it is clear that the metering opening 42 of the sealing disk 41 has a special contour. This contour can be constituted, for example, by a semicircle whose radius corresponds to the radius of the through opening 9 and by a cog-shaped projection 43 protruding from this semicircle in the direction of the sealing seat 13. This projection 43 extends with a conical form pointing sharply in the direction of the sealing seat 13. This achieves the fact that with only a slight attraction of the armature 26 at first only the projection 43—if need be also only partially—comes to coincide with the through opening 9. In this manner, very precise metering possibilities are achieved, in particular ones which occur in very fine steps. The evacuation of the inner chamber 12 connected to the outlet fitting 11 takes place as a function of the vacuum prevailing in the intake tube 4. However, the invention is naturally not limited to the embodiment of the sealing disk 41 and in particular of the metering opening 42 shown in FIG. 5; on the contrary, in principle, closing bodies 40 with arbitrarily shaped and designed metering openings 42 can be used.

The embodiment according to the invention of the fastening device 44 of the closing body 40 and the embodiment according to the invention of the spring element 50 acting on the closing body 40 will be described in detail below in conjunction with the three exemplary embodiments shown in FIGS. 2 to 4. The apparatus of the closing body 40 and the spring element 50 of the valve device 1 of FIG. 1 is shown in an enlarged fashion in FIGS. 2 to 4. In the first exemplary embodiment of FIG. 2, the spring element 50 is realized by means of a leaf spring 48 while the spring element in the exemplary embodiments shown in FIGS. 3 and 4 is constituted by means of a spiral spring 49.

In the valve device 1 shown in FIG. 2, on the end of the armature 26 remote from the valve spring 27, a fastening device 44 is provided, which is preferably embodied formed onto the armature 26 or is part of the armature, and this device essentially extends in the radial direction i.e. parallel to the outlet fitting 11 and is designed asymmetrically with regard to the longitudinal axis 5 of the valve device 1. On the end disposed toward the right in FIG. 2, the fastening device 44 has an oblique flat surface 47, wherein the radial span of the fastening device 44 in the axial direction decreases toward the outlet fitting 11, i.e. toward the bottom in FIG. 2. On the end of the oblique flat surface 47, the fastening device 44 thereby protrudes in the radial direction further into the inner chamber 12 than the outlet fitting 11 so that the flat surface 47 is inclined in the direction toward the closing body 40.

On the end opposite from the oblique flat surface 47 in the radial direction, the fastening device 44 extends radially to the inner wall of the bottom housing part 8 and has a guide element 45 there which is guided in a corresponding housing groove 46 of the bottom housing part 8. The guide element 45 is advantageously embodied as a round bolt or in the shape of a ball. This guidance of the fastening device 44 effectively prevents a rotation of the armature 26 and the spring element 50 and closing body 40 connected to the fastening device, which prevents a leak of the valve device 1 at the sealing seat 13 caused by a tilting of the components.

On its side face remote from the outlet fitting 11, the closing body 40 is provided with a cap 51, which permits a technically simple fastening of a leaf spring 48. The orientation of the cap 51 is thereby disposed parallel to the sealing disk 41 or to the longitudinal axis 5 of the valve device 1 so that the plane of the oblique flat surface 47 and the plane of the cap 51 are not parallel. In the simplest case, the leaf spring 48 is screwed or riveted to the cap 51. The leaf spring 48 extends from the cap 51 of the closing body 40 to the oblique flat surface 47 of the fastening device 44 on the armature 26 to which the leaf spring 48 is likewise fastened by means of a screw connection, riveting, or the like. The oblique flat surface 47 pre-stresses the leaf spring 48 against the sealing disk 41 of the closing body 40 and presses the sealing disk with the required pressure against the sealing seat 13 of the outlet fitting 11.

The lateral forces on the spring element 50, which were described in the beginning and occurred in the prior art, can clearly be prevented by means of this construction since the entire apparatus of the closing body 40 and spring element 50 moves along with the armature 26. The construction of the spring element 50 and its connection with the closing body 40 in a manner according to the invention achieves a reliable seal of the sealing seat 13 in a simple manner, wherein manufacturing tolerances of the sealing seat 13, sealing disk 41, and armature 26 can also be compensated for.

For the acoustic damping of the valve device 1, the end stops of the armature 26 in the housing groove 46 and against the annular face 34 of the magnet core 24 are provided with corresponding damping stops 58 and 59. For example, the stops 58 and 59 are made of an elastic material such as rubber. It is also advantageous to electrically trigger the valve device 1 in such a way that during operation, the armature 26 never strikes against the magnet core 24 or against the stroke limitation of the housing groove 46.

During 10 Hz operation, the valve device 1 is operated for example with a keying ratio of 50%. When the power of the excitation coil 23 is switched on for the duration of 50 ms for example, the armature 26 is attracted by the magnetic force but due to the large valve stroke, does not reach the upper stop 59 against the annular face 34 of the magnet core 24 because the power in the excitation coil 23 has been switched off in the meantime. During the next 50 ms, in which the power is switched off, the armature 26—without having reached the upper stop 59—is moved downward by the spring force of the valve spring 27. In this downward motion, the remaining energy in the excitation coil 23, which can be controlled for example by means of a Z-diode, and the long valve stroke of the armature 26 prevents the armature 26 from striking against the stop 58 in the housing groove 46 in the closed position because the excitation coil 23 has been supplied with power again in the meantime. The armature 26 cannot follow the electric triggering simultaneously and consequently oscillates between the two end positions without quite reaching them. In this manner, and undulating metering of the regeneration gas is produced which results in a clear improvement in the even distribution of the metering in comparison to pulse valves, without high-frequency triggering.

It should be further emphasized at this point that the valve device 1 according to the invention can be operated with low-frequency triggering events as well as with high-frequency triggering events (continuous or pulsed), and is also suitable for use in engines with gasoline direct injection.

A second exemplary embodiment of the closing body 40 and spring element 50 is shown in FIG. 3. Elements which have already been described are provided with corresponding reference numerals. With this construction, the fastening device 44 is comprised of a bolt 52 which is attached to the bottom end of the armature 26 and is aligned in the radial direction. On an end of the bolt 52 disposed on the left in FIG. 3, the bolt 52 engages in a corresponding through opening 53 in the sealing disk 41 of the closing body 40. As a result of this, the closing body 40 is connected to the armature 26 and is moved along with the armature.

On the end remote from the sealing disk 41, the bolt 52 extends radially into a corresponding housing groove 46 in the lower housing part 8. The guidance of the bolt 52, whose end is advantageously embodied as round or ball-shaped for this purpose, in the housing groove 46 prevents a rotation of the armature 26 and the closing body 40 in the valve device 1 in this instance as well.

In the exemplary embodiment shown in FIG. 3, the spring element 50 is constituted by a pin 54, which is pressed against the closing body 40 by means of a spiral spring 49. The end of the pin 54 oriented toward the closing body 40 is thereby securely guided in a corresponding recess 55 in the sealing disk 41 so that at all times throughout the stroke motion of the valve device 1, the pin 54 remains in contact with the sealing disk 41 at the position of the recess 55 and presses the sealing disk against the sealing seat 13. The pin 54 and the spiral spring 49 are supported in a recess 56 in the bottom housing part 8, which recess is disposed on the end of the inner chamber 12 opposite from the outlet fitting 11. For this reason, the inlet fitting 11, in a modification to the first exemplary embodiment of FIGS. 1 and 2, is provided in the extension of the longitudinal axis 5 of the valve device 1, on the bottom housing part 8.

In order to prevent the lateral forces on the spring element 50, which were described in the beginning and occurred in the prior art, the pin 54 with the spiral spring 49 is supported so that the spring element can rotate around a rotation point 57 which is preferably disposed outside the longitudinal axis of the pin 54. This structural measure achieves the fact that the pin 54 rotates around the rotation axis 57 with the stroke motion of the armature 26 and the attendant stroke motion of the closing body 40 so that the spiral spring 49 deforms exclusively in the direction of its longitudinal axis. The spiral spring 49 is selected so that the force component in the direction toward the sealing seat 13 assures a secure seating of the closing body 40 against the sealing seat 13 of the outlet fitting 11 at all times.

An alternative embodiment of the spring element 50 will now be explained in conjunction with FIG. 4. Analogous to the above-described second exemplary embodiment from FIG. 3, in this exemplary embodiment, the closing body 40 is connected to the armature 26 by way of a bolt 52 guided in a housing groove 46. Otherwise, elements that have already been described are provided with corresponding reference numerals.

In this construction as well, the spring element 50 has a spiral spring 49, which exerts a pressure against the sealing disk 41 of the closing body 40. The longitudinal axis of the spiral spring 49 thereby advantageously coincides with the longitudinal axis of the sealing seat 13 and the outflow fitting 11 so that the force transmission from the spiral spring 49 onto the sealing disk 41 takes place centrally. A pin 54 is once again guided in the spiral spring 49 and is rigidly connected to the lower housing part 8 on the end remote from the closing body 40. The pin 54 is used on the one hand as a guide for the spiral spring 49 and on the other hand is used to center a guide element 39, which is disposed on the end of the pin 54 oriented toward the closing body 40. The guide element 39 has a centering opening 67 in which the pin 54 engages and a contact face 68 which is annular, for example, and rests against the sealing disk 41. The spiral spring 49 extends between the inner wall of the lower housing part 8 and the guide element 39, which preferably has a corresponding shoulder for containing the spiral spring 49, and transmits the spring force directly onto the guide element 39. The guide element 39 in this instance is not connected to either the pin 54 or the sealing disk 41 so that the sealing disk 41 can move along with the armature 26 while the guide element 39 is secured by the pin 54 in its position opposite the sealing seat 13. Since the sealing disk 41 and the guide element 39 slide against one another during the stroke motion of the closing body 40, the guide element 39 is preferably also comprised of a material with a low frictional resistance such as ceramic.

In this third exemplary embodiment, the position of the spring element 50 remains unchanged throughout the entire stroke motion of the valve device 1 and only a movement of the closing body 40 in relation to the spring element 50 occurs. In this manner, disruptive lateral forces on the spiral spring 49 are likewise prevented and the closing body 40 is pressed tightly against the sealing seat 13 at all times.

The above explanations made in connection with the first exemplary embodiment in relation to the acoustic damping and the potential uses of the valve device 1 naturally apply analogously to the exemplary embodiments of FIGS. 3 and 4.

The foregoing relates to a preferred exemplary embodiments of the invention, it being understood that other variants and embodiments thereof are possible within the spirit and scope of the invention, the latter being defined by the appended claims.

What is claimed is:

1. A valve device (1), for tank ventilation in motor vehicles, comprising a valve housing (6, 7, 8) with an inlet fitting (10) and an outlet fitting (11), and armature (26) that is provided inside the valve housing (6, 7, 8) and is moved by means of an electromagnet (22), a closing body (40) that is connected to the armature (26) and closes a sealing seat (13) of the outlet fitting (11) when the electromagnet (22) is without power and opens the outlet fitting (11) when the electromagnet (22) is supplied with power whereby a free cross sectional area between the inlet fitting (10) and the outlet fitting (11) can be continuously changed, a spring element (50) which presses the closing body (40) with a pressure against the sealing seat (13), the spring element (50) having a spiral spring (49) which deforms exclusively in the direction of its longitudinal axis, even during a stroke motion of the valve device (1), said armature (26) having a fastening device (52) mounting the closing body (40) for movement with said armature, and a groove in said housing guiding same fastening device to secure the armature (26) against rotating around a longitudinal axis (5).

2. The valve device according to claim 1, in which the spring element (50) with the spiral spring (49) is disposed in a stationary fashion in the valve housing (6, 7, 8) and that the closing body (40) can be moved in relation to the stationary spring element (50).

3. The valve device according to claim 2, in which the spring force of the spring element (50) is directed onto sealing seat (13) along the axis of the outlet opening.

4. The valve device according to claim 2, in which the spring element (50) is provided with a guide element (39), which transmits the spring force of the spiral spring (49) onto the closing body (40).

5. The valve device according to claim 4, in which the spring force of the spring element (50) is directed onto sealing seat (13) along the axis of the outlet opening.

6. A valve device (1), for tank ventilation in motor vehicles, comprising a valve housing (6, 7, 8) with an inlet fitting (10) and an outlet fitting (11), a free cross sectional area between the inlet fitting and the outlet fittings, an armature (26) that is provided inside the valve housing (6, 7, 8) and is moved by means of an electromagnet (22), a closing body (40), the closing body being connected to and supported on the armature (26) only by a (leaf spring) element (48, 50) and closing a sealing seat (13) of the outlet fitting (11) when the electromagnet (22) is without power and opening the outlet fitting when the electromagnet (22) is supplied with power whereby the free cross sectional area between the inlet fitting (10) and the outlet fitting (11) can be continuously changed, the armature (26) having a flat surface (47) whose plane is oriented obliquely relative to a plane of the sealing seat (13) and the closing body (40), said spring element (50) engaging and pressing the closing body (40) with a pressure against the sealing seat (13) and having a leaf spring (48), which is connected on one end to the oblique flat surface (47) of the armature (26), and on another end to the closing body (40), wherein the leaf spring (48) is pre-stressed in such a way that the leaf spring presses the closing body (40) against the sealing seat (13).

7. The valve device according to claim 6, in which the armature (26) has a guide element (45), which is guided in a housing groove (46) in order to secure the armature (26) against rotating around a longitudinal axis (5).

8. The valve device according to claim 6, further comprising at least one rivet or at least one screw attaching the leaf spring (48) to the armature (26) and/or the closing body (40).

9. The valve device according to claim 8, in which the armature (26) has a guide element (45), which is guided in a housing groove (46) in order to secure the armature (26) against rotating around a longitudinal axis (5).

* * * * *